(12) United States Patent
McKiness

(10) Patent No.: US 10,098,320 B2
(45) Date of Patent: Oct. 16, 2018

(54) PET DISH ASSEMBLY

(71) Applicant: Christopher McKiness, Fort Pierce, FL (US)

(72) Inventor: Christopher McKiness, Fort Pierce, FL (US)

( * ) Notice: Subject to any disclaimer, the term of this patent is extended or adjusted under 35 U.S.C. 154(b) by 28 days.

(21) Appl. No.: 14/966,431

(22) Filed: Dec. 11, 2015

(65) Prior Publication Data

US 2017/0164579 A1    Jun. 15, 2017

(51) Int. Cl.
*A01K 5/01* (2006.01)

(52) U.S. Cl.
CPC ...................................... *A01K 5/01* (2013.01)

(58) Field of Classification Search
CPC ...... A01K 5/01; A01K 5/0107; A01K 5/0114; A01K 5/0142
USPC ............. 119/51.01, 51.5, 61.5, 61.56, 61.57; D30/133
See application file for complete search history.

(56) References Cited

U.S. PATENT DOCUMENTS

| | | | |
|---|---|---|---|
| 1,483,833 A * | 2/1924 | Potter | A47J 43/287 248/229.16 |
| 1,576,232 A * | 3/1926 | Cooke | A47G 21/145 248/37.6 |
| 2,283,019 A | 5/1940 | Serr | |
| D151,473 S | 10/1948 | Stahler | |
| 2,605,624 A * | 8/1952 | Halladay | A47J 43/287 131/240.1 |
| D177,053 S | 3/1956 | Kofford | |
| 2,848,013 A | 8/1958 | Kofford | |
| D197,046 S | 12/1963 | Shirley | |
| D212,161 S | 9/1968 | Robert | |
| 3,661,121 A * | 5/1972 | Zielin | A01K 5/0114 119/61.57 |
| D226,838 S | 5/1973 | Ruskin | |
| 4,011,951 A | 3/1977 | Boyer | |
| 4,205,629 A | 6/1980 | Wix | |
| 4,399,772 A * | 8/1983 | Salinas | A01K 5/0142 119/51.5 |
| D273,430 S | 4/1984 | Salinas | |
| D295,091 S | 4/1988 | Swartzendruber | |
| D302,756 S * | 8/1989 | Trine | D30/133 |
| 5,000,124 A | 3/1991 | Bergen | |
| 5,105,963 A * | 4/1992 | Scott | A47J 43/287 220/735 |
| 5,501,176 A | 3/1996 | Tully | |
| 5,564,362 A | 10/1996 | Fiveash | |
| D375,819 S | 11/1996 | Benson | |
| D377,243 S | 1/1997 | Fiveash | |
| 5,855,184 A | 1/1999 | Eichler et al. | |
| D424,758 S | 5/2000 | Akopdjanov | |
| D442,341 S | 5/2001 | Morgan | |
| 6,382,578 B2 | 5/2002 | Azevedo | |
| D505,757 S | 5/2005 | Wojcik et al. | |
| 6,901,880 B2 | 6/2005 | Hammer | |

(Continued)

*Primary Examiner* — Monica L Williams
*Assistant Examiner* — Brady W Frazier
(74) *Attorney, Agent, or Firm* — Simpson & Simpson PLLC

(57) ABSTRACT

A pet dish assembly, including a base, a vertical support member extending upwardly from the base, at least one ladle slidingly secured to a top surface of the vertical support member, the ladle comprising an arcuate handle at a first end and a bowl at a second end.

15 Claims, 8 Drawing Sheets

(56) References Cited

U.S. PATENT DOCUMENTS

| | | | |
|---|---|---|---|
| 6,928,953 B2 * | 8/2005 | Axelrod | A01K 1/0356 119/51.01 |
| 6,959,665 B2 | 11/2005 | Flowers et al. | |
| 7,077,372 B2 | 7/2006 | Moran | |
| 7,219,623 B2 | 5/2007 | Flowers et al. | |
| 7,261,264 B2 | 8/2007 | Moran | |
| D552,802 S | 10/2007 | Kuster | |
| 7,284,499 B1 | 10/2007 | Kuster | |
| 7,318,391 B2 | 1/2008 | Brillon | |
| D562,504 S | 2/2008 | Parks | |
| D568,004 S | 4/2008 | Tiemann | |
| 7,353,775 B1 * | 4/2008 | Stelmach | A01K 1/04 119/61.54 |
| 7,380,517 B2 | 6/2008 | Flowers et al. | |
| D580,109 S | 11/2008 | Rutherford et al. | |
| 7,484,477 B2 | 2/2009 | Wojcik et al. | |
| D598,711 S * | 8/2009 | Franco | D7/505 |
| D627,109 S | 11/2010 | Man | |
| 7,857,274 B1 | 12/2010 | Parks | |
| 8,082,883 B2 | 12/2011 | Aletti | |
| 8,146,534 B1 | 4/2012 | Robertson | |
| D682,483 S | 5/2013 | Silverman | |
| D695,974 S * | 12/2013 | Young | D30/130 |
| D720,896 S | 1/2015 | Chang | |
| 2006/0175228 A1 * | 8/2006 | Howel | A47J 43/28 206/751 |
| 2006/0196436 A1 | 9/2006 | Nichols | |
| 2006/0213926 A1 * | 9/2006 | Kraus | B65D 25/04 222/129 |
| 2013/0334377 A1 | 12/2013 | Lee | |
| 2014/0178540 A1 * | 6/2014 | Johnson | A47J 27/002 426/243 |
| 2015/0122185 A1 * | 5/2015 | Lucky | A01K 5/0142 119/51.5 |
| 2015/0308615 A1 * | 10/2015 | Neaves | A01K 1/035 119/61.57 |

* cited by examiner

PET DISH ASSEMBLY

FIELD OF THE INVENTION

This invention relates generally to supplies for pets, and more specifically, to food and water bowls for pets, and, even more specifically to an apparatus for holding a food and/or water bowl for a pet in a cantilevered manner to accommodate pets who are wearing an Elizabethan collar.

BACKGROUND OF THE INVENTION

Providing nourishment for a pet can be difficult. Pets have preferences just like humans, except most pets cannot verbally communicate those preferences. While some pets will eat anything, anywhere, others require a particular brand of food to be placed in a particular location. Some believe a properly sized food bowl positioned in the proper location is essential. Cats have unique characteristics, which can make it difficult to decide the best way to feed them. For example, cats use whiskers to navigate their surroundings. A bowl that is too deep may interfere with their whiskers and cause discomfort. Also, when a cat eats, she tends to crouch to bring her head closer to the bowl. A bowl that is placed too high might cause frustration or discomfort. Additionally, instinctually, cats are watchful of their surroundings especially when they eat, to detect rivals or predators. Some cats prefer to eat in remote locations such as, on top of your living room armoire. A cat might refuse to eat if she is unable to visualize her environment.

Elizabethan collars, otherwise known as e-collars, a pet cone, a pet lamp-shade, pet radar dish or a cone of shame can be problematic for cats and dogs. The Elizabethan collar is a protective medical device worn around an animal's neck to prevent the animal from biting or licking at a wound. The Elizabethan collar is generally open-ended and frusto-conical. Some pets adjust to wearing an e-collar while others simply do not. Although the e-collar is often translucent for cats and dogs, the e-collar usually interferes with peripheral vision and some pets become clumsy. It is not uncommon for a pet wearing an e-collar to walk into walls or to tip over food and water bowls. Some pets are so disoriented that they refuse to eat or drink altogether. These collars also obviously can interfere with, and block access to food and water bowls.

U.S. Pat. No. 4,399,772 (Salinas) discloses an animal feeder designed to protect feed from insects. One embodiment of the animal feeder disclosed in the '772 patent includes a T-shaped arm supported within a water bowl and a pair of diametrically-opposite rings each removably accepting a bucket on each end of the T-shaped arm. Another embodiment of the animal feeder disclosed in the '772 patent includes an arm having four rings circumferentially and equally spaced from each other. Unfortunately, the animal feeder disclosed in the '772 patent is vulnerable to tipping. Additionally, due to the presence of the arm within and surrounding the water, an animal might have difficulty accessing the water particularly if the animal is wearing an e-collar.

Therefore, there has been a long-felt need for a pet dish assembly which includes food and water bowls which are raised above the floor so that they are easily accessible to pets wearing an e-collar. A pet dish assembly having food and water bowls which are unobstructed from surrounding structures is needed. Additionally, there has been a long-felt need for a stable pet dish assembly which features at least one elevated serving piece. A stable pet dish assembly that is adjustable to accommodate different pets is needed. A stable and adjustable pet dish assembly that is also easy to clean is also needed. A pet dish assembly having food and water bowls which are easily removed for cleaning is needed. There has been a long-felt need for a pet dish assembly which has improved stability and functionality.

BRIEF SUMMARY OF THE INVENTION

The present invention is a pet dish assembly, including a base, a vertical support member extending upwardly from the base, at least one ladle slidingly secured to a top surface of the vertical support member, the ladle comprising an arcuate handle at a first end and a bowl at a second end.

The present invention is also a pet dish assembly including a base, a vertical support member extending upwardly from the base, at least one ladle cantilevered from the vertical support member, the ladle comprising a handle at a first end and a bowl at a second end, where the ladle is secured to the vertical support member at a point between the first end and the second end.

Furthermore, the present invention is a pet dish assembly including a base, a vertical support member extending upwardly from the base at least one arm secured to the vertical support member, the arm extending downwardly from the vertical support member to a point that is substantially co-planar with the base, where the arm is operatively arranged to hold a bowl.

A general object of the invention is to provide a pet dish assembly which has improved stability and functionality. This is achieved by providing a pet dish assembly which includes food and water bowls which are raised above the floor and unobstructed from surrounding structures. This is further achieved by providing a means for preventing the pet dish assembly from tipping.

Another object of the invention is to provide a pet dish assembly which features at least one elevated serving piece which is adjustable to accommodate different pets.

Yet another object of the invention is to provide a stable and adjustable pet dish assembly that is also easy to clean.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspect. The present invention is intended to include various modifications and equivalent arrangements within the spirit and scope of the appended claims.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. With respect to the current invention, dimensions should be understood as follows: height refers to the vertical elevation of a structural element; length refers to the horizontal span of a structural element; and width refers to the depth of a structural element. The term "ladle" means a long-handled tool including a cup-shaped member for receiving a food or water bowl or for holding the food or water itself. The term "ladle" is used interchangeably with the term "arm". Although any methods, devices or materials similar or equivalent to those described herein can be used in the practice or testing of the invention, the preferred methods, devices, and materials are now described.

Figure 1:
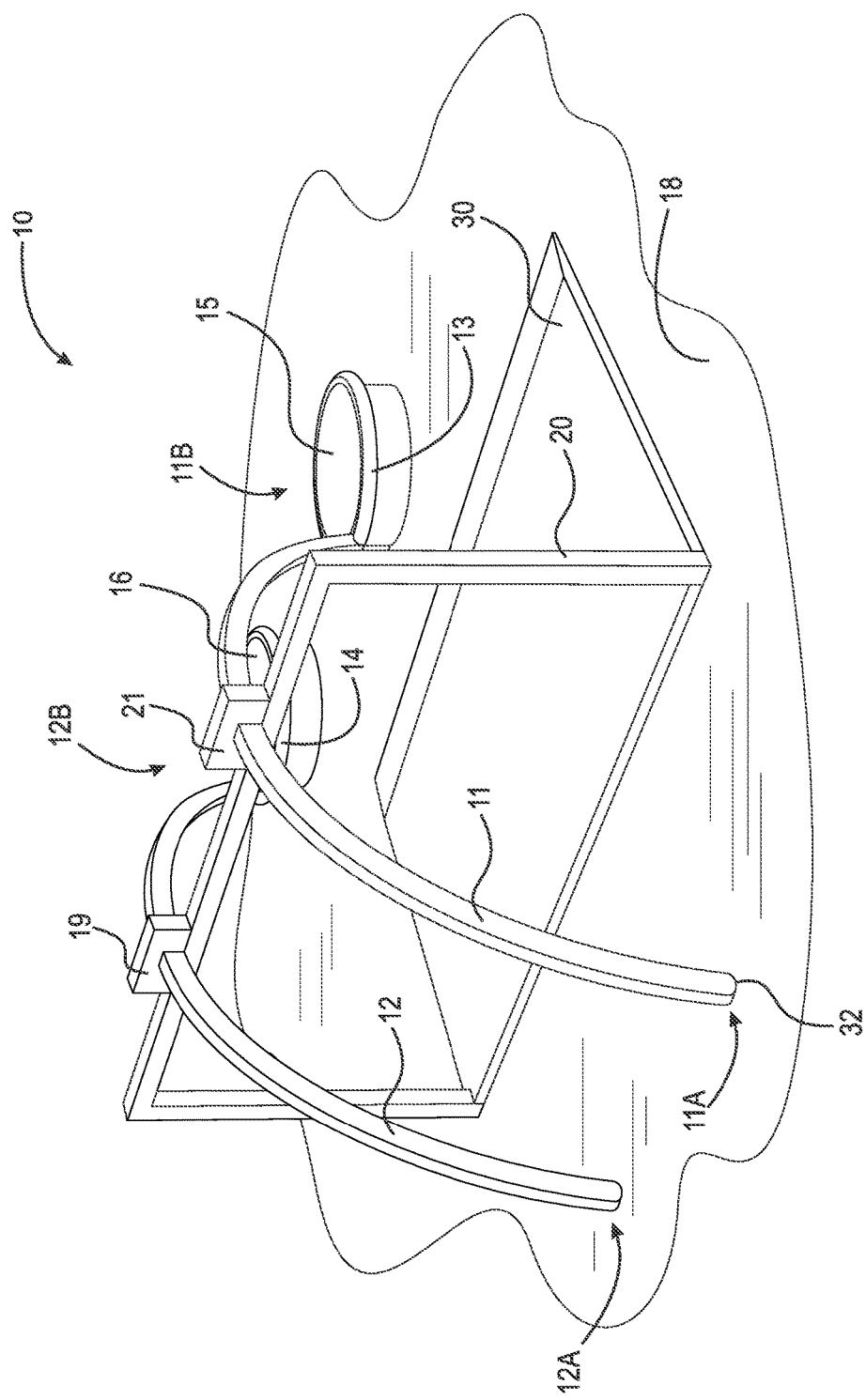
FIG. 1 is a perspective view of a pet dish assembly according to the invention.

Adverting now to the Figures, FIG. 1 is a perspective view of pet dish assembly 10 which broadly includes base 30, vertical support member 20, and at least one ladle 11. Vertical support member 20 extends upwardly from base 30. In a preferred embodiment ladle 11 is slidingly secured to a top surface of vertical support member 20. In an example embodiment, ladle 11 is fixedly secured to vertical support member 20. In an example embodiment, ladle 11 is secured (slidingly or fixedly) to a bottom surface of vertical support member 20. Ladle 11 is an arcuate handle at end 11A and bowl 15 at end 11B. In an example embodiment, bowl 15 is integral with ladle 11 to hold food and/or water. End 11B of assembly 10 extends in a plane that is substantially parallel to base 30 so that the food and/or water held therein is elevated from floor surface 18 and unobstructed.

Figure 3:
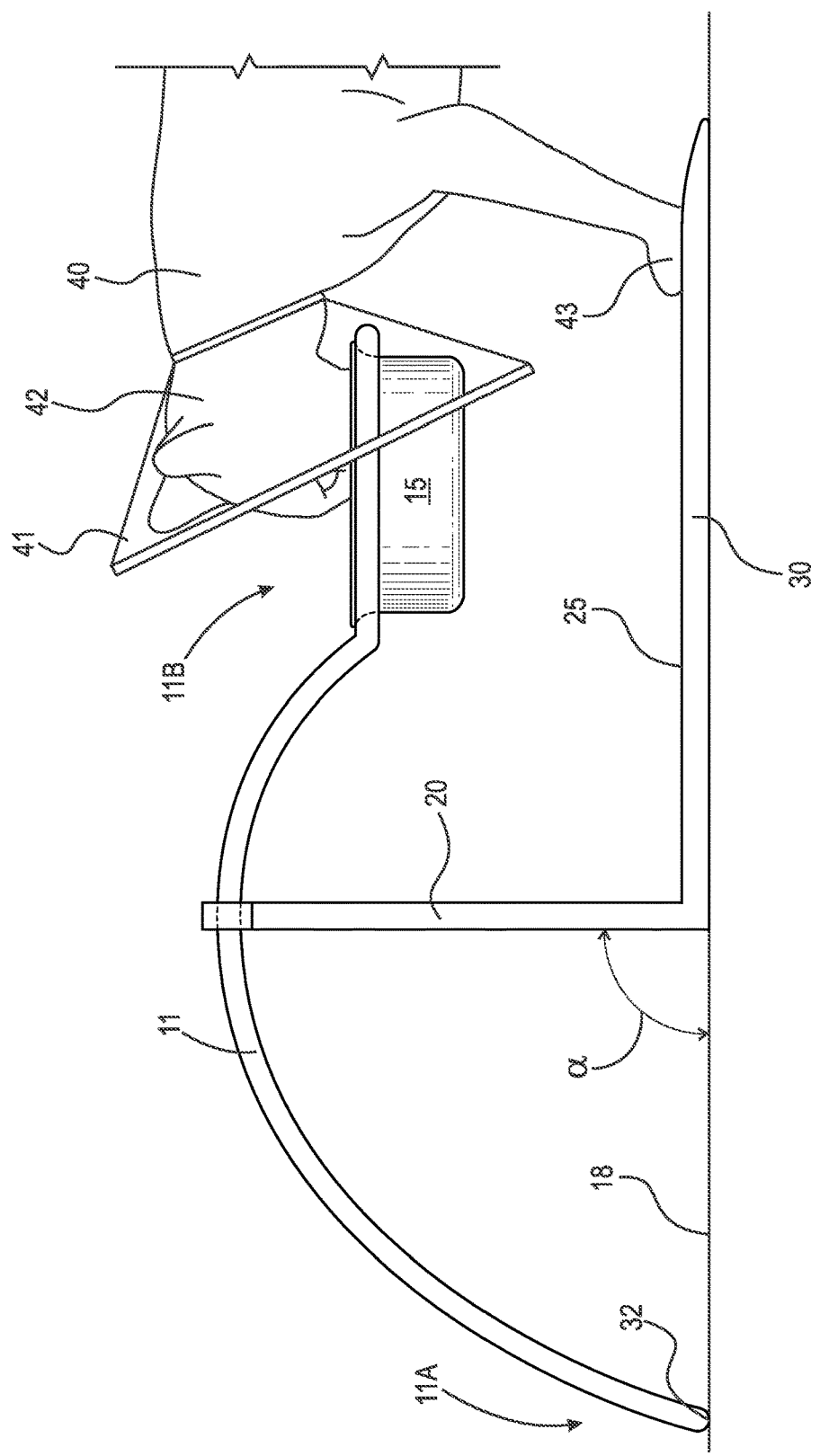
FIG. 3 is a side view of the pet dish assembly shown in FIG. 1 including a cat feeding from the pet dish assembly.

In an example embodiment, end 11A of ladle 11 extends downwardly to point 32 that is substantially co-planar with a bottom surface of base 30. In the embodiment shown in FIG. 1, the arcuate handle is continuously arcuate between vertical support member 20 and point 32. Both base 30 and end 11A are supported atop floor surface 18. Base 30 is a substantially rectangular platform on which a pet can stand to stabilize the assembly as shown in FIG. 3. It should be appreciated that base 30 could take any shape. In an alternate embodiment, instead of a platform base 30 could comprise one or more support members which protrude outwardly from vertical support member 20 along floor surface 18 in a direction opposite the direction in which end 11A extends.

To accommodate food and water separately, pet dish assembly 10 includes ladle 12 in additional to ladle 11. In other words, ladles 11 and 12, respectively, are operatively arranged to hold either pet food or a pet food bowl and either water or a water bowl, respectively. It should be appreciated however, that a single ladle can hold both food and water in a partitioned bowl. In FIG. 1, both ladles 11 and 12 contact floor surface 18 however, both need not contact floor surface 18. In an example embodiment, each ladle 11 and 12 can include an elastic element (or foot) on the end which contacts floor surface 18.

Figure 2:
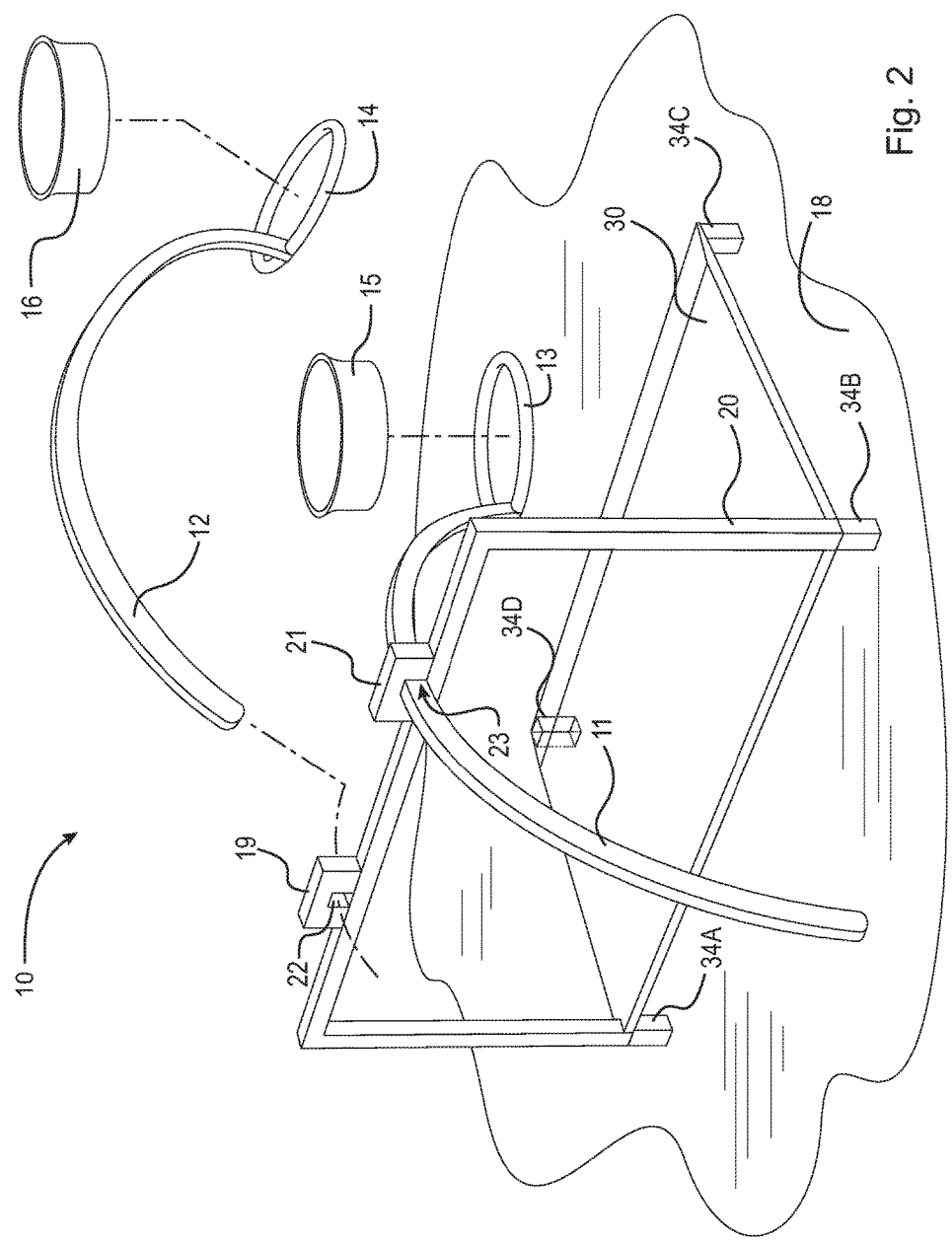
FIG. 2 is a perspective partial exploded view of the pet dish assembly shown in FIG. 1.

Ladle 11 is secured in an aperture within connecting member 21 and ladle 12 is secured in aperture 22 (shown in FIG. 2) within connecting member 19. FIG. 2 shows a perspective partial exploded view of pet dish assembly 10. As shown in FIG. 2, ladle 12 can be removed from pet dish assembly 10 for replacement or cleaning purposes through aperture 22. A user can pull ladle 12 through aperture 22 along the arc shown. Ladle 11 can be removed similarly.

As discussed above, bowl 15 can be removed as shown in FIG. 2. To accommodate a removable bowl, ladle 11 can include an opening at end 11B. Such opening can be cup-shaped member 13 which is a continuous ring or such opening could be an expandable non-continuous ring where cup-shaped member 13 would include a circumferential gap. An expandable non-continuous ring could accommodate bowls of differing sizes. Cup-shaped member 13 preferably includes a tapered inner surface and bowl 15 preferably includes a similarly tapered outer surface. In an example embodiment, base 30 includes at least two legs that extend outwardly in a direction opposite that of the direction of the arcuate handles of the ladles. As shown in FIG. 2, base 30 comprises legs 34A-D arranged proximate the four corners thereon. In FIG. 2, bowl 15 of ladle 11 is removable from cup-shaped member 13 and bowl 16 of ladle 12 is removable from cup-shaped member 14. It should be appreciated that alternative bowls or cans can be held with cup-shaped members 13 and 14. Such bowls or cans can take any shape. Additionally, bowls 15 and 16 can include indicia of metrics.

FIG. 3 is a side view of pet dish assembly 10 including cat 40 feeding from bowl 15. Cat 40 is shown wearing e-collar 41. Because bowl 15 is unobstructed by surrounding structures, cat 40 is less likely to become distracted from e-collar 41 contacting surrounding structures. Moreover, cat 40 is able to stand on top surface 25 of base 30 with at least one paw 43 to prevent pet dish assembly 10 from moving and/or tipping. Base 30 extends outwardly further than ladle 11 to provide space on which cat 40 can stand. Base 30 is tapered along the edge opposite vertical support member 20 however, it need not be tapered.

Vertical support member 20 is shown extending upwardly from base 30 at substantially right angle $\alpha$. It should be appreciated though that vertical support member 20 could extend upwardly at an angle that is larger or smaller than 90 degrees. End 11A of ladle 11 is shown contacting floor surface 18 and is substantially co-planar with base 30 to prevent pet dish assembly 10 from tipping. Ladle 11 is shown having a continuous arcuate shape between ends 11A and 11B. Bowl 15 is shown extending substantially parallel to base 30.

Figure 4:
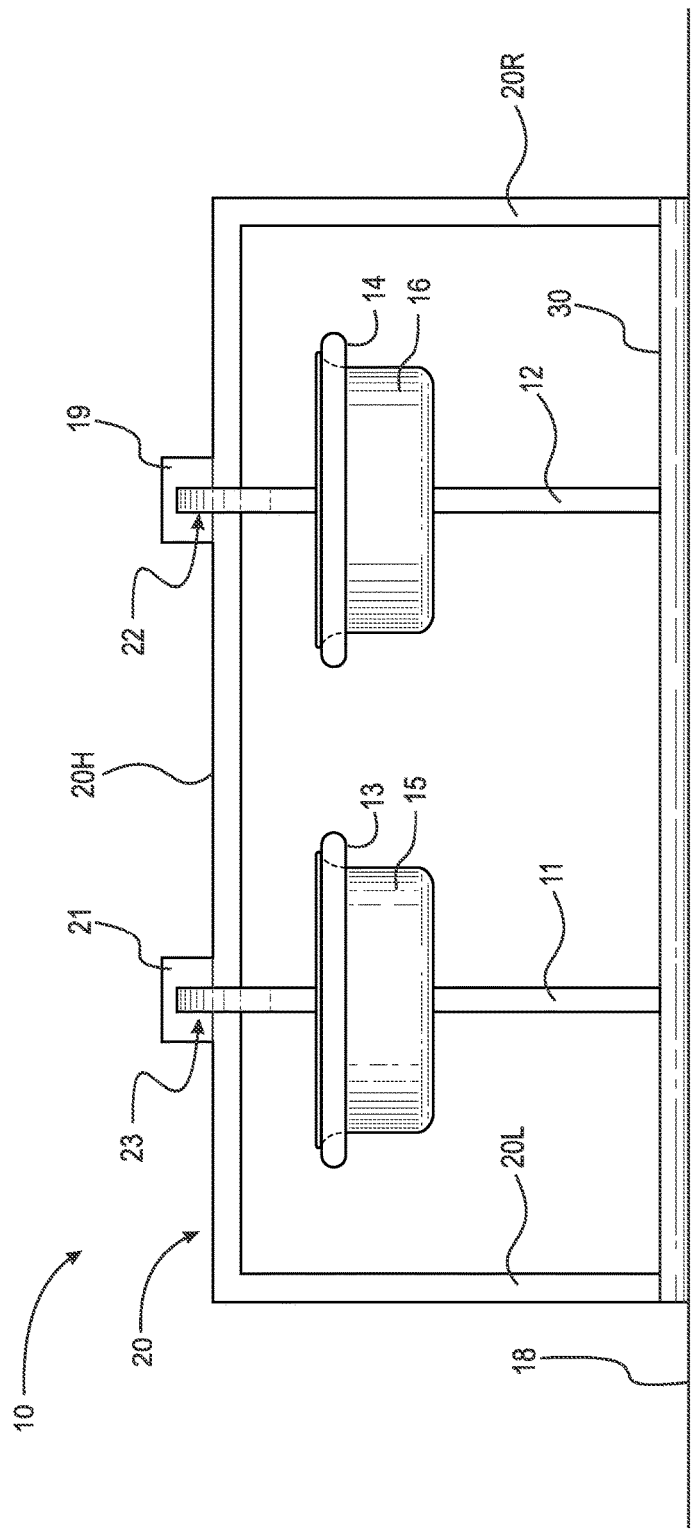
FIG. 4 is a front view of the pet dish assembly shown in FIG. 1.

In FIG. 4, which is a front view of pet dish assembly 10, ladles 11 and 12 are shown holding bowls 15 and 16 such that bowls 15 and 16 are elevated at approximately the same height relative to base 30. Vertical support member 20 includes longitudinal members 20L and 20R and horizontal member 20H connecting longitudinal members 20L and 20R. More specifically, bowl 15 is spaced apart a distance from base 30, a distance from bowl 16, a distance from longitudinal member 20L, and a distance from horizontal member 20ll such that bowl 15 has a clearance in all directions.

Figure 5:
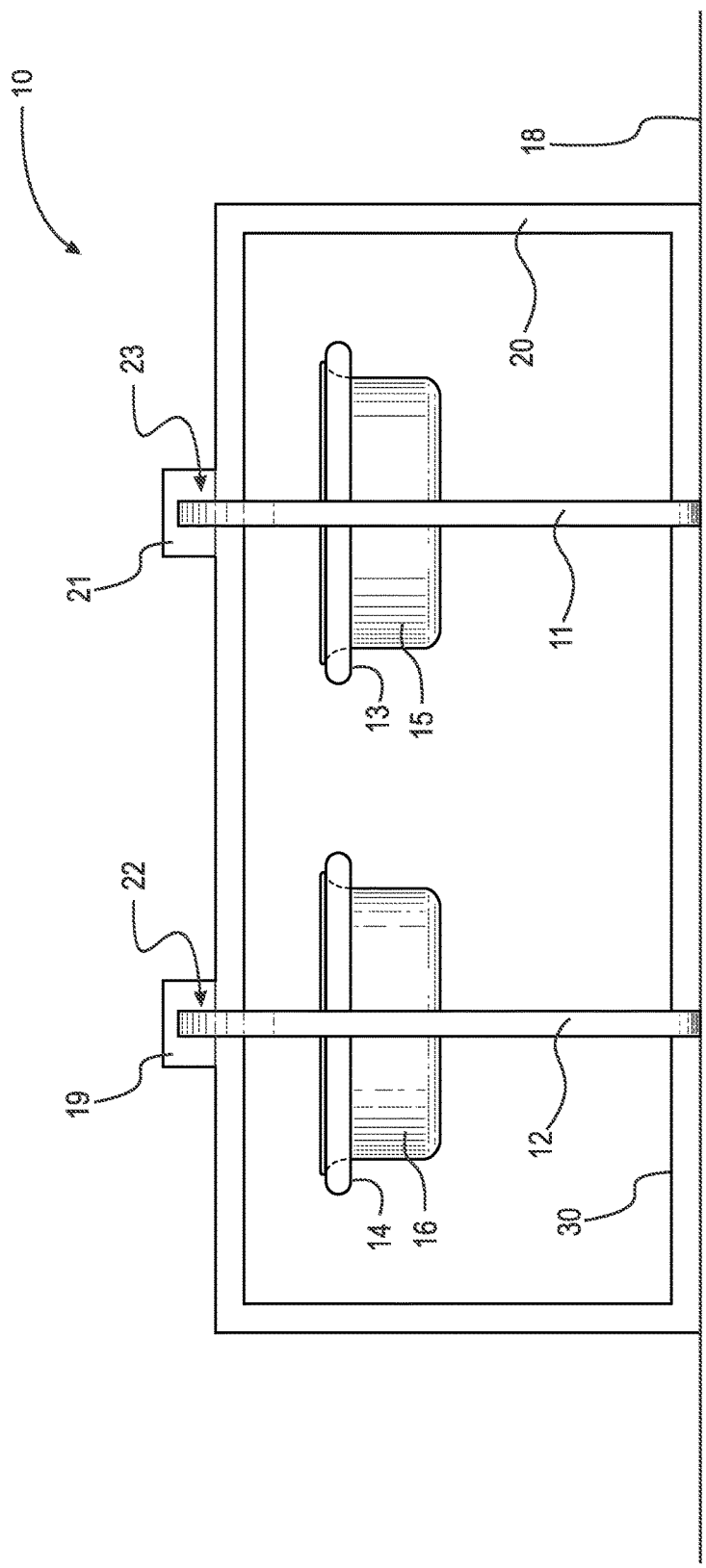
FIG. 5 is a rear view of the pet dish assembly shown in FIG. 1.

An opening is defined between base 30 and vertical support member 20. In FIG. 4, the opening is rectangular but, the opening can take any shape. In an alternate embodiment, vertical support member 20 is continuous across top surface 25 of base 30 and no space would be defined. FIG. 5 is a rear view of pet dish assembly 10 which shows ladles 11 and 12 extending downwardly from vertical support member 20 to floor surface 18 as discussed above.

Figure 6:
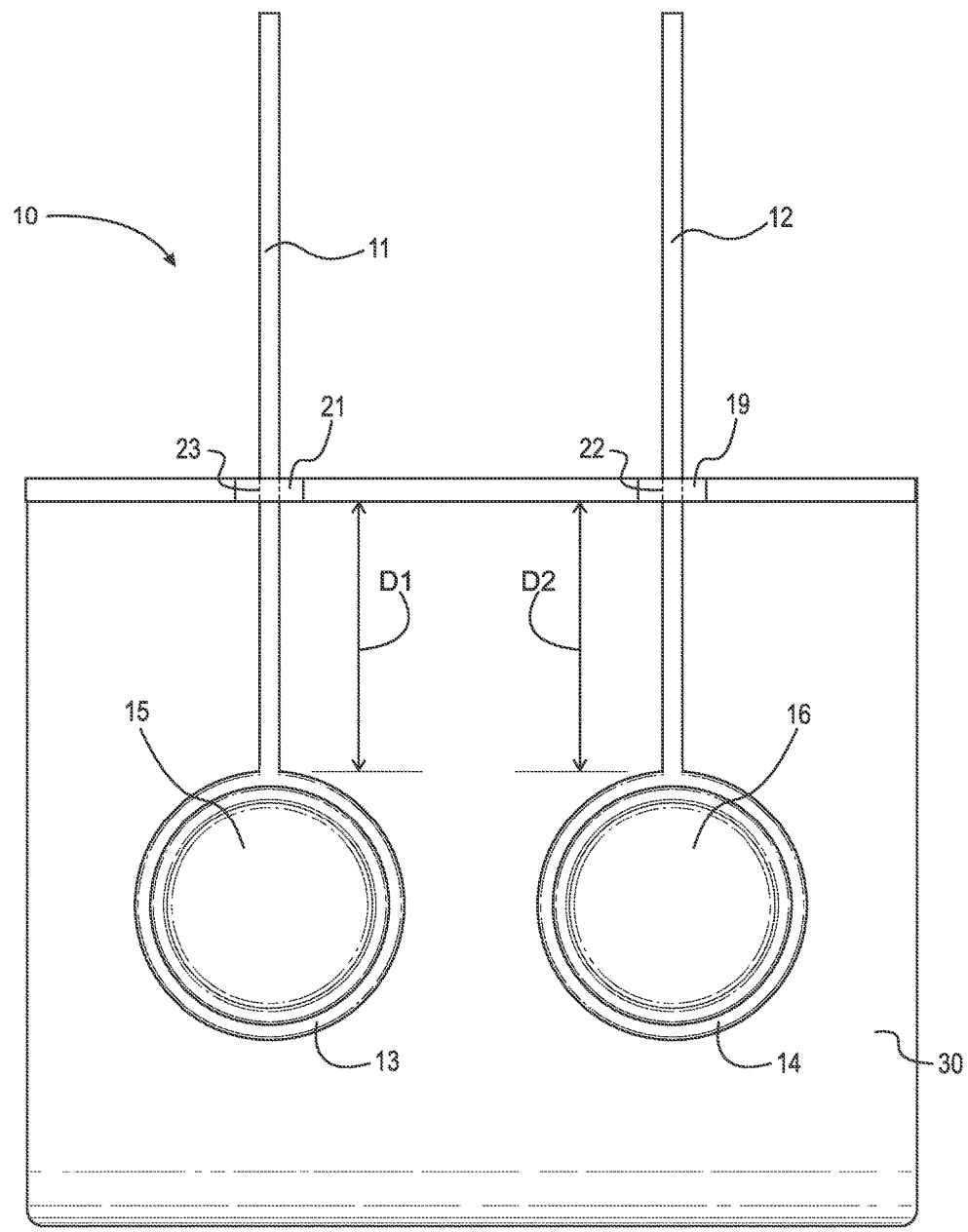
FIG. 6 is a top down view of the pet dish assembly shown in FIG. 1.

FIG. 6 is a top down view of pet dish assembly 10 showing ladles 11 and 12 extending through openings 23 and 22, respectively. Ladles 11 and 12 are shown extending from vertical support member distances D1 and D2, respectively. Distances D1 and D2 can be shortened or extended together or independently of the other to accommodate different pets and/or bowls.

Figure 7:
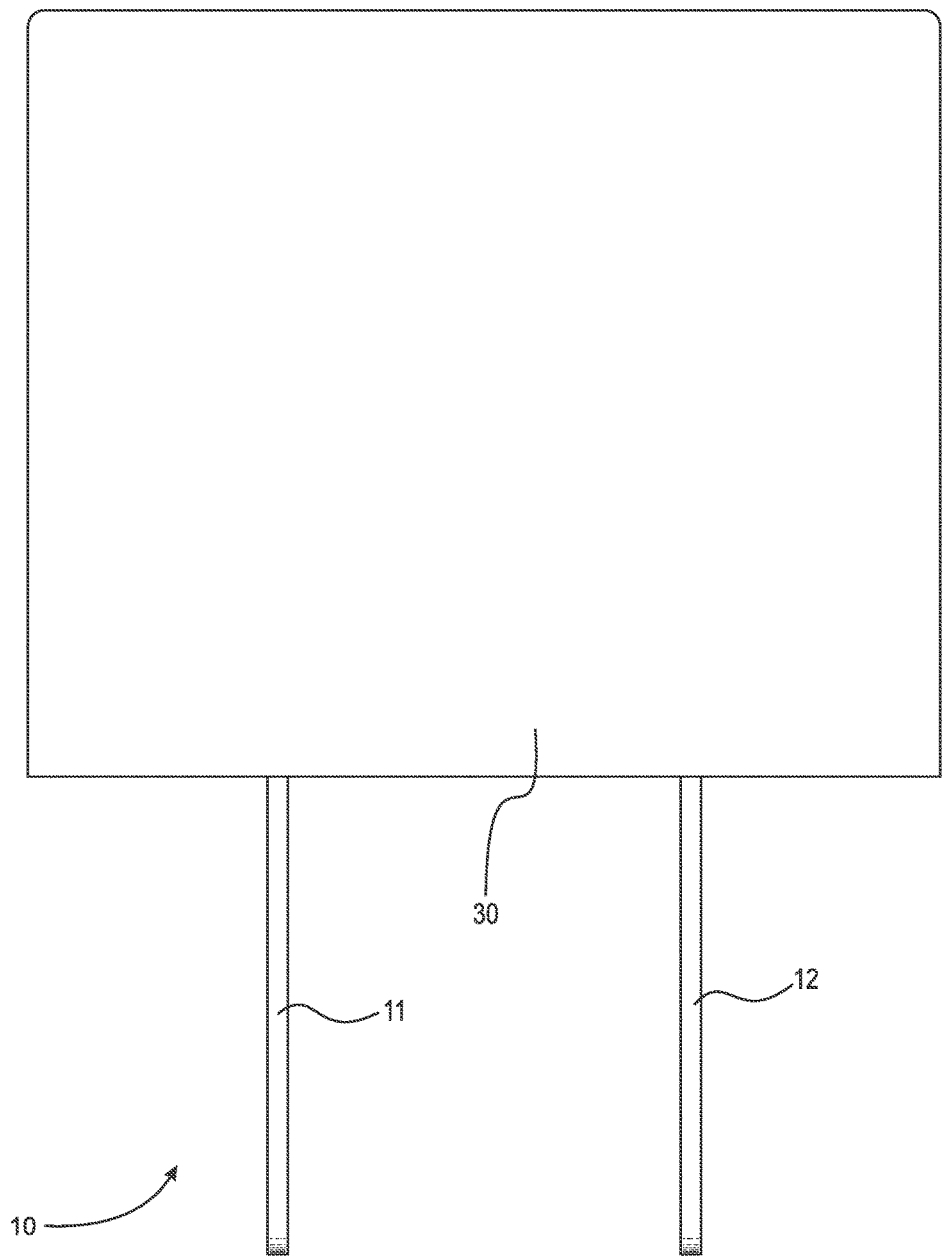
FIG. 7 is a bottom up view of the pet dish assembly shown in FIG. 1.

FIG. 7 is a bottom up view of pet dish assembly 10 showing ladles 11 and 12 extending outwardly from base 30. As discussed above, base 30 is rectangular but it could take any shape. Similarly, ladles 11 and 12 could be any suitable shape.

Figure 8:
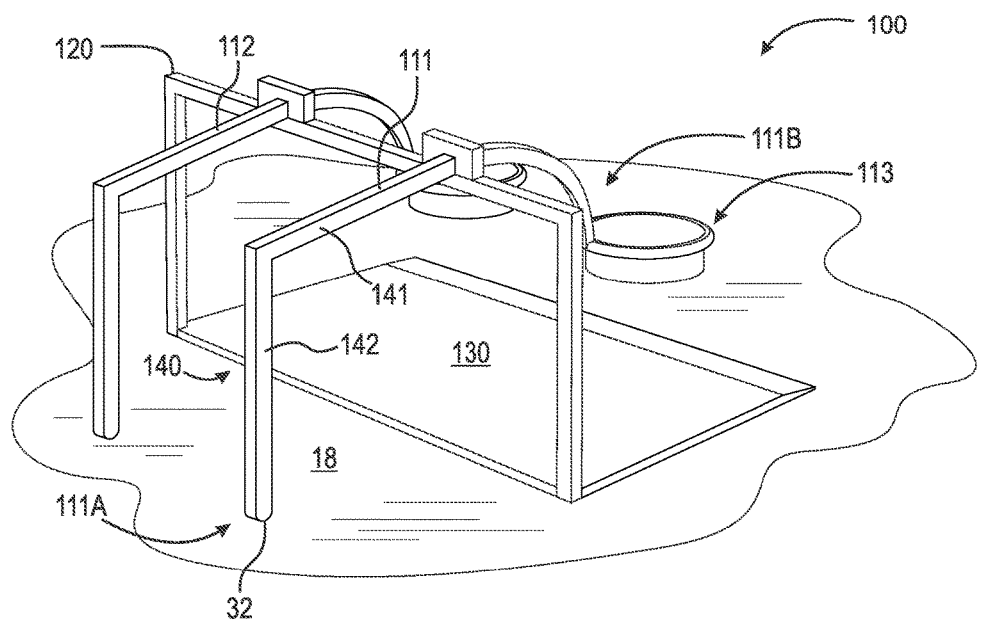
FIG. 8 is a perspective view of a pet dish assembly according to the invention; and, FIG. 9 is a perspective view of a pet dish assembly according to the invention.

FIG. 8 shows pet dish assembly 100 including vertical support member 120 and ladle 111 cantilevered from vertical support member 120. The discussion pertaining to pet dish assembly 10 applies to pet dish assembly 100 except as noted below. Ladle 111 is secured to vertical support member 120 at a point between end 111A and end 111B. In the embodiment shown in FIG. 8, ladle 111 includes handle 140 which includes member 141 extending outwardly substantially parallel to base 130 and member 142 extending downwardly substantially perpendicular to base 130. In an example embodiment, handle 140 is substantially straight (or arranged at an angle) between vertical support member 120 and floor surface 18 atop which assembly 100 is placed. Handle 140 can be integrally formed with ladle 111 or it could be removable to allow ladle 111 to be removed from vertical support member 120. For example, member 140 could disconnect from member 141 and ladle 111 could be removed as discussed previously.

Figure 9:
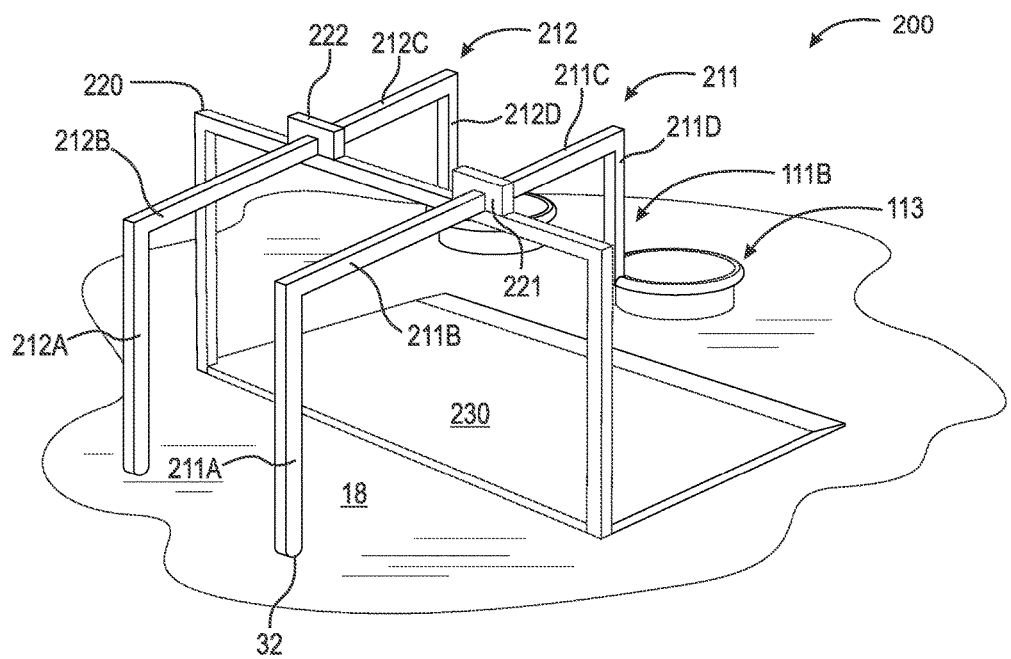

Pet dish assembly 200 is shown in FIG. 9. The discussions pertaining to pet dish assemblies 10 and 100 apply except as noted below. Pet dish assembly 200 includes at least one ladle 211 or 212, or, preferably, both ladles 211 and 212. Each ladle 211 and 212 is slidingly secured to a top surface of vertical support member 220. However, each ladle can be fixedly secured in place. Ladle 211 includes members 211A, 211B, 211C and 211D which are integrally formed. However, member 221A could be removable to facilitate removal of ladle 211 from vertical support member 220. Member 211A extends upwardly from floor surface 18 substantially perpendicular to base 230. Members 211B and 211C extend outwardly from member 211A substantially parallel to base 230. Member 211D extends downwardly from member 211C substantially perpendicular to base 230 and substantially parallel to member 211A. Members 211A and 211B form a substantially right angle but any suitable angle is contemplated. Similarly, members 211C and 211D form a substantially right angle but any suitable angle is contemplated. Ladles 211 and 212 are slidable through a respective aperture in connecting members 221 and 222, respectively, such that the food and/or water bowls can be positioned closer to (or further away from) vertical support member 220. Ladle 211 is substantially similar to ladle 212 thus, the discussion regarding ladle 211 applies to ladle 212.

In an example embodiment, pet dish assemblies 10, 100 and 200 are approximately 13 inches long, 12 inches wide and 6 inches tall and weighs approximately 3 pounds empty. In another example embodiment, pet dish assemblies 10, 100 and 200 are approximately 18 inches long, 16 inches wide and 8 inches tall and weighs approximately 5 pounds empty. In another example embodiment, pet dish assemblies 10, 100 and 200 are approximately 13 inches long, 12 inches wide and 8 inches tall and weighs approximately 5 pounds empty. In another example embodiment, pet dish assemblies 10, 100 and 200 are approximately 18 inches long, 16 inches wide and 10 inches tall and weighs approximately 8 pounds empty. The dimensions discussed above are merely illustrative and are not intended to limit the scope of the invention. Additionally, the ratios of the dimensions discussed above are not intended to limit the scope of the invention. Various dimensions and ratios are contemplated.

In an example embodiment, pet dish assemblies 10, 100 and 200 are made of stainless steel. Elastic material, such as rubber, can be used to hold bowls in place. Additionally, elastic material can be applied to the bottom surface of the bases to prevent the assemblies from slipping along the floor surface. Pet dish assemblies 10, 100 and 200 could also be made of wood or any other suitable alternative. A water pump can be included as well and could operate on 4 double AA batteries or a 6.0 volt AC adapter.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

REFERENCE NUMERALS 10 assembly
11 ladle, arm
11A end
11B end
12 ladle, arm
12A end
12B end
13 cup-shaped member
14 cup-shaped member
15 bowl
16 bowl
18 floor surface
19 connecting member
20 vertical support member
20L longitudinal member
20R longitudinal member
20ll horizontal member
21 connecting member
22 aperture
23 aperture
25 top surface
30 base
32 point
34A leg
34B leg
34C leg
34D leg
40 cat 41 e-collar
42 head
43 paw
100 assembly
111 ladle, arm
111A end
111B end
112 ladle, arm
113 cup-shaped member
120 vertical support member
130 base
140 member
141 member
142 member
200 assembly
211 ladle, arm
211A member
211B member
211C member
211D member
212 ladle, arm
212A member
212B member
212C member
212D member
220 vertical support member
221 connecting member
222 connecting member
α angle
D1 distance
D2 distance

What is claimed is:

1. A pet dish assembly, comprising:
a base;
a vertical support member extending upwardly from said base, the vertical support member including:
at least one longitudinal member arranged substantially perpendicular to said base, the longitudinal member having a proximate end connected to said base and a distal end;
a horizontal member arranged substantially parallel to said base and connected to said distal end;
a first connecting member secured to said horizontal member; and,
a second connecting member secured to said horizontal member;
a first ladle slidingly secured to said horizontal member, said first ladle comprising:
a first arm having a first end and a second end, said first arm arranged to extend through said first connecting member such that said first end extends downwardly from said horizontal member to a first point that is substantially co-planar with said base; and,
a first bowl connected to said second end, said first bowl arranged elevationally between said base and said horizontal member; and,
a second ladle slidingly secured to said horizontal member, said second ladle comprising:
a second arm having a third end and a fourth end, said second arm arranged to extend through the second connecting member such that said third end extends downwardly from said horizontal member to a second point that is substantially co-planar with said base; and,
a second bowl connected to said fourth end, said second bowl arranged elevationally between said base and said horizontal member.

2. The pet dish assembly recited in claim 1, wherein said first ladle and said second ladle is capable of being fixedly secured to said horizontal member.

3. The pet dish assembly recited in claim 1, wherein said first bowl is removably connected to said first arm and said second bowl is removably connected to said second arm.

4. The pet dish assembly recited in claim 1, wherein said base comprises a substantially rectangular platform.

5. The pet dish assembly recited in claim 1, wherein said first arm is arcuate and said second arm is arcuate.

6. The pet dish assembly recited in claim 1, wherein said base comprises at least two legs.

7. The pet dish assembly recited in claim 1, wherein said first bowl is arranged to hold food and said second bowl is arranged to hold water.

8. The pet dish assembly recited in claim 1, wherein:
said first arm includes a first portion between said first point and said first connecting member which is continuously arcuate; and,
said second arm includes a second portion between said second point and said second connecting member which is continuously arcuate.

9. The pet dish assembly recited in claim 1, wherein said first ladle and said second ladle is cantilevered from said horizontal member.

10. The pet dish assembly recited in claim 1, wherein:
said first arm is secured to said connecting member at a point between said first end and said second end; and,
said second arm is secured to said connecting member at a point between said third end and said fourth end.

11. The pet dish assembly recited in claim 1, wherein said first arm comprises linear members and said second arm comprises linear members.

12. The pet dish assembly recited in claim 1, wherein said first arm is partially arcuate and said second arm is partially arcuate.

13. The pet dish assembly recited in claim 1, wherein:
said first arm comprises a first member extending outwardly substantially parallel to said base and a second member extending downwardly substantially perpendicular to said base; and,
said second arm comprises a third member extending outwardly substantially parallel to said base and a fourth member extending downwardly substantially perpendicular to said base.

14. The pet dish assembly recited in claim 1, wherein said first arm includes a first opening at said second end to hold said first bowl and said second arm includes a second opening at said fourth end to hold said second bowl.

15. The pet dish assembly recited in claim 14, wherein said first and second openings extend outwardly in a plane that is substantially parallel to said base.

* * * * *